United States Patent [19]

Ueda et al.

[11] Patent Number: 5,043,832
[45] Date of Patent: Aug. 27, 1991

[54] SINGLE MOTOR SELECTIVE DRIVE TAPE CARTRIDGE LOADING/UNLOADING APPARATUS

[75] Inventors: Yoshifumi Ueda; Susumu Hisadomi, both of Kanagawa, Japan

[73] Assignee: Kabushiki Kaisha Toshiba, Kawasaki, Japan

[21] Appl. No.: 560,788

[22] Filed: Jul. 31, 1990

[30] Foreign Application Priority Data

Aug. 9, 1989 [JP] Japan .................................. 1-204751

[51] Int. Cl.⁵ .............................................. G11B 17/04
[52] U.S. Cl. .................................. 360/99.07; 360/95; 360/85; 360/96.5
[58] Field of Search ................ 360/84, 130.22, 130.24, 360/99.07, 90, 95, 85, 96.5; 242/197-199

[56] References Cited

U.S. PATENT DOCUMENTS

| | | | |
|---|---|---|---|
| 4,723,183 | 2/1988 | Tsuchida et al. | 360/95 |
| 4,752,845 | 6/1988 | Suzuki | 360/96.5 |
| 4,908,723 | 3/1990 | Ohyama et al. | 360/95 |
| 4,912,578 | 3/1990 | Katohno et al. | 360/85 X |
| 4,951,164 | 8/1990 | Yasaka et al. | 360/95 |

FOREIGN PATENT DOCUMENTS 53-146609 12/1978 Japan .............................. 360/130.22

*Primary Examiner*—Aristotelis M. Psitos
*Assistant Examiner*—Alfonso Garcia
*Attorney, Agent, or Firm*—Oblon, Spivak, McClelland, Maier & Neustadt

[57] ABSTRACT

A selective drive cartridge loading/unloading apparatus connects one motor with multiple driving objects. A worm gear is mounted on the motor shaft in such a manner that it rotates together with the shaft and can move axially along the shaft. The worm gear meshes with different power transmission mechanisms when it is at different points along the shaft.

3 Claims, 17 Drawing Sheets

SINGLE MOTOR SELECTIVE DRIVE TAPE CARTRIDGE LOADING/UNLOADING APPARATUS

FIELD OF THE INVENTION

The present invention relates generally to a selective drive apparatus, and more particularly, to a tape cartridge loading/unloading apparatus which is used for selectively carrying out a cartridge loading/unloading operation and a tape loading/unloading operation of the cartridge in magnetic tape recorders.

BACKGROUND OF THE INVENTION

Magnetic tape recorders, for instance, video tape recorders, audio tape recorders, etc. are provided with a tape cartridge loading/unloading mechanism which loads a tape cartridge automatically when it is slightly inserted into the tape cartridge inserting slot. Tape cartridge loading mechanism operates to carry a tape cartridge automatically from the tape cartridge inserting slot and load it on the reel turntable and, inversely, carry a tape cartridge loaded on the reel turntable to the tape cartridge inserting slot (unloading). The tape loading operates to pull the tape out of the tape cartridge loaded in the reel turntable and form a tape running route by bringing it into contact with a magnetic head, and restore the tape from this state into the tape cartridge.

In conventional magnetic tape recorders, the driving mechanisms are operated through use of exclusive motors for the tape cartridge loading and tape loading. Further, a system for tape loading using a separate capstan motor for tape carrying is also considered. However, if many motors are used, magnetic tape recorders become heavy and expensive. This system, however, has problems in that a complicated switching mechanism is needed and it is difficult to make recorders small and to get a high speed operation.

As described above, conventional magnetic tape recorders become heavy and expensive because many motors are used. Further, if a capstan motor is used to perform partial loading in order to reduce the number of motors, a complicated switching mechanism becomes necessary and it is not possible to make magnetic tape recorders small and get high speed operation. In addition, while stability is important for a capstan motor, its driving force is important for the loading operation and therefore, it is used for a different purpose.

SUMMARY OF THE INVENTION

It is an object of the present invention to provide a selective drive apparatus, such as a tape cartridge loading/unloading apparatus, which is simple in structure and capable of connecting one motor with multiple driving objects.

In order to achieve the above object, a selective drive apparatus includes a motor, a shaft which is driven by the motor, a worm gear which is mounted on the shaft in such a manner that it rotates together with the shaft but freely moves axially along the shaft, a first power transmission mechanism which is driven by meshing with the worm gear when the worm gear is at the first axial position on the shaft and the shaft is rotated in a first rotating direction, a first stopper interlocked with the first power transmission mechanism for keeping the worm gear at the first axial position until the first power transmission mechanism is driven by a fixed amount and thereafter for allowing axial movement of the worm gear, a second stopper which keeps the worm gear at a second axial position on the shaft, a second power transmission mechanism which is driven by meshing with the worm gear when the worm gear is at the second axial position and rotated in the first rotating direction, and a third stopper which interlocks with the second power transmission mechanism when the worm gear is at the second axial position and is rotated in a second rotating direction, wherein the third stopper keeps the worm gear at the second axial position until the second power transmission mechanism is driven by a fixed amount and then allows the worm gear to return to the first axial position.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
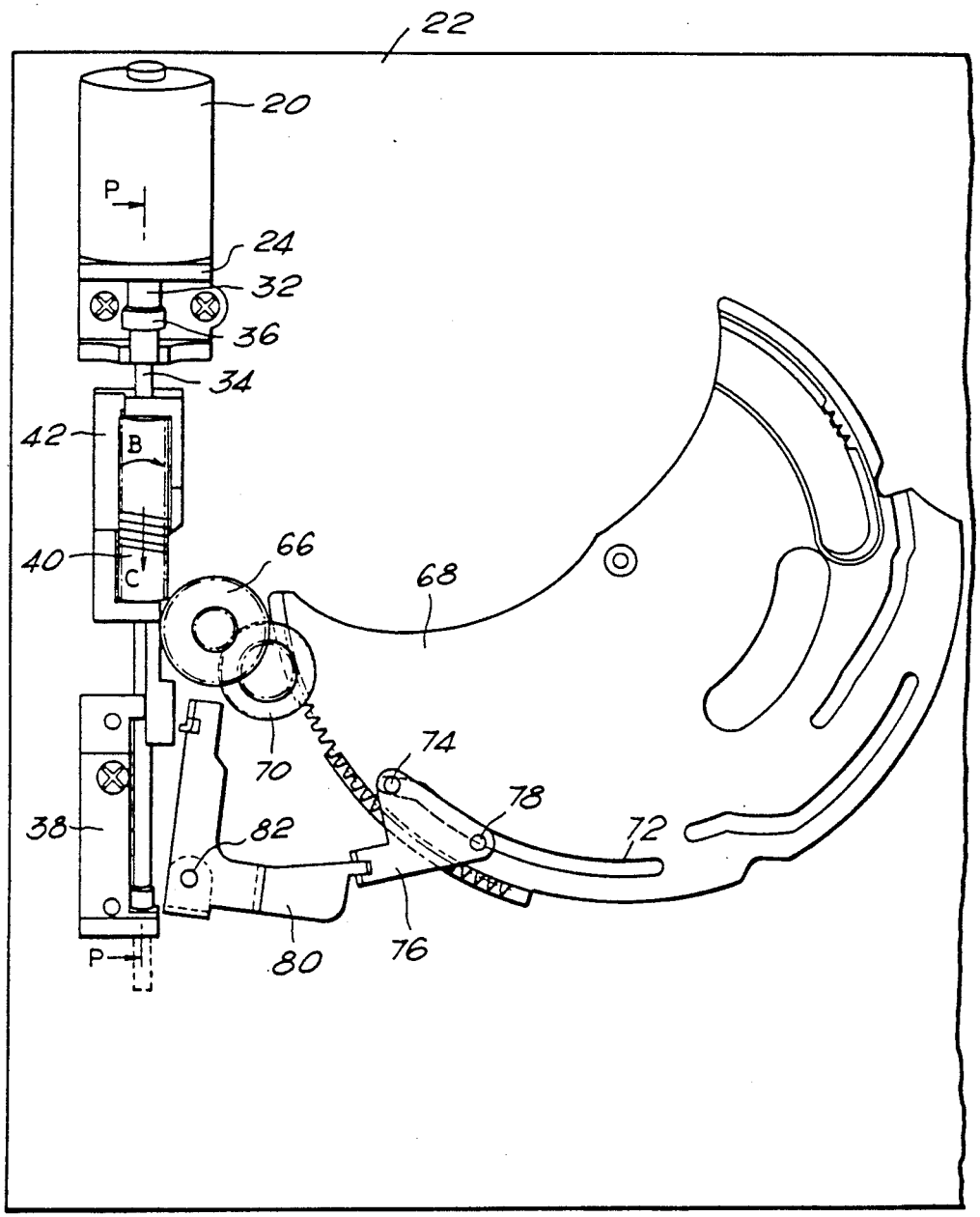
FIG. 1 is a plan view showing an embodiment of the tape cartridge loading/unloading apparatus according to the present invention.

The present invention will be described in detail with reference to the FIGS. 1 through 18. Throughout the drawings, like or equivalent reference numerals or letters will be used to designate like or equivalent elements for simplicity of explanation.

Figure 2:
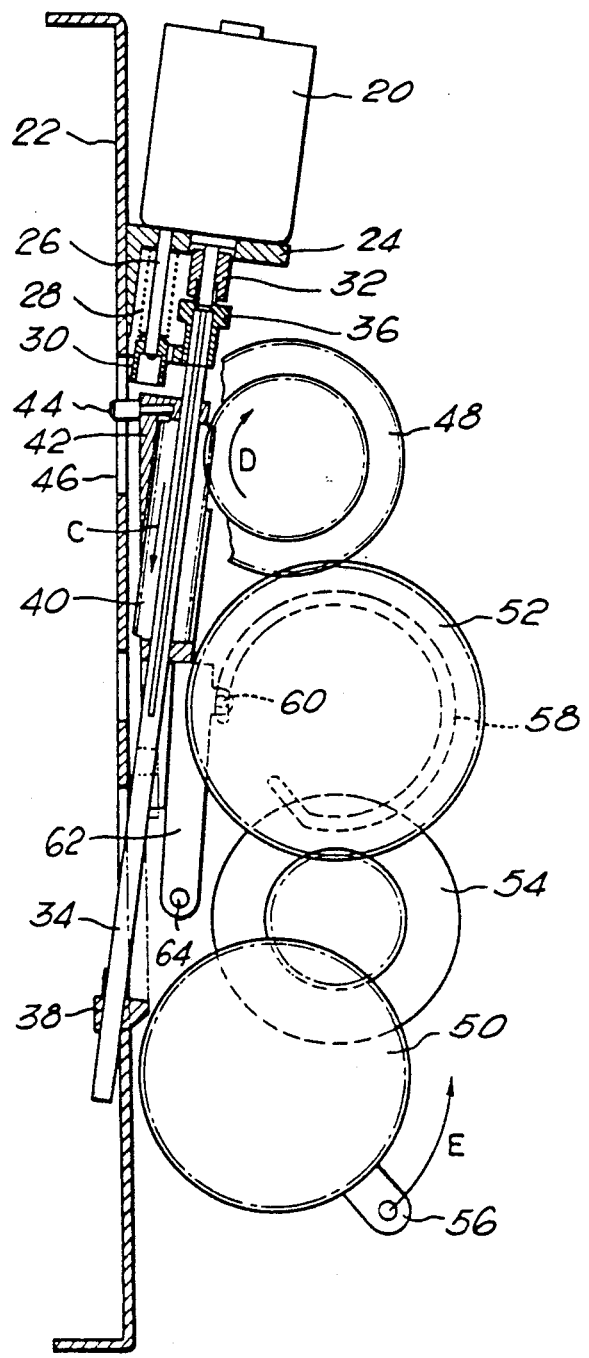
FIG. 2 is a section taken on line P—P in FIG. 1.

Referring now to FIGS. 1 and 2, a first embodiment of the tape cartridge loading/unloading apparatus according to the present invention will be described in detail.

As shown in FIGS. 1 and 2, a motor 20 is mounted on a main chassis 22 of a magnetic tape recorder and fixed by a mounting device composing of parts 24, 26, 28 and 30. The rotary motor shaft 32 of the motor 20 is positioned in a first axial position to rotate in the inclined direction against the plane surface of the main chassis 22 and a worm shaft 34 is coaxially connected to the rotary shaft 32.

This worm shaft 34 is extending to the back of the main chassis 22 through an opening defined in the main chassis.

The motor shaft 32 is connected to the worm shaft 34. One end of the worm shaft 34 is supported by a bearing 36. The other end of the worm shaft 34 is supported by another bearing 38 fixed to the main chassis 22.

Figure 17:
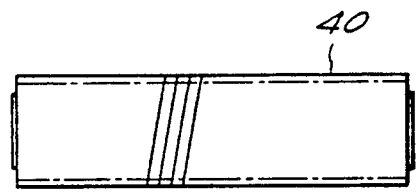
FIGS. 17a and 17b are side and end elevations showing the worm gear shown in FIGS. 1 through 16.
Figure 17:
Figure 18:
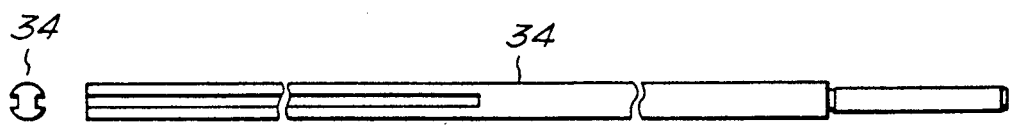
FIGS. 18a and 18b are end and side elevations showing the worm shaft shown in FIGS. 1 through 16.
Figure 18:
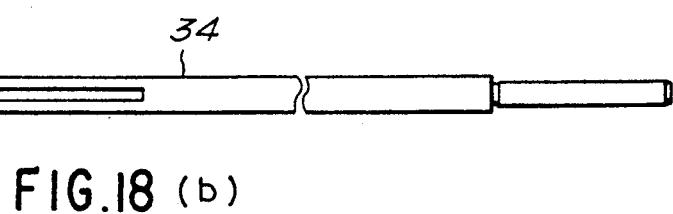

A worm gear 40 is mounted to the worm shaft 34 in such a manner that the worm gear 40 rotates together with the worm shaft 34 but is axially movable freely. Shown in FIG. 17 are the side and front views of the worm gear 40. FIG. 18 shows the front and side views of the worm shaft 34. There is a groove formed axially on the circumference of the worm shaft 34. A projecting part provided in the shaft hole of the worm gear 40 goes into this groove. Thus, the worm gear 40 rotates together with the worm shaft 34 but the worm gear 40 is axially movable freely.

Further, the worm gear 40 is housed in a worm gear box 42 which is in a body with the worm gear. This worm gear box 42 allows the worm gear 40 to rotate but is able to move axially together with the worm gear 40. The worm gear box 42 is provided with a pin 44 which projects toward the main chassis 22 and is inserted into an opening 46 defined in the main chassis 22 so as to prevent the worm gear box 42 from rotating and to keep the worm gear 40 at a second axial position when the worm gear box 42 moves in the direction of arrow C together with the worm gear 40.

Shown in FIGS. 1 and 2 is the first axial position of the worm gear 40. It is possible to connect a different power transmission mechanism to the worm gear 40 for every axial position.

FIGS. 1 and 2 show the worm gear 40 kept at the first axial position. A worm gear 48 is meshing with the worm gear 40. This worm gear 48 is mounted in a freely movable state to an unillustrated sub-chassis which is vertically mounted on the top of the main chassis 22. The rotary plane surface of the worm gear 48 is perpendicular to the plane surface of the main chassis. Rotation of the worm gear 48 can be transmitted to a gear 50 via gears 52 and 54. These gears 50, 52 and 54 are also mounted to the sub-chassis in a way that they are freely rotatable.

An arm 56 projects from the rotary circumference of the gear 50. When this arm 56 moves in the direction of arrow E, the tape cartridge holder of the tape cartridge loading mechanism on the main chassis 22 is moved.

On the rotary surface of the gear 52, there is a cam groove 58 formed into which a pin 60 provided at the free end of an arm 62 is inserted so as to change over the rotating position of the arm 62 when the gear 52 rotates a fixed number of turns. The arm 62 is also mounted to the sub-chassis by a shaft 64.

FIGS. 1 and 2 show the state when the tape cartridge loading starts. When the worm shaft 34 is rotated by the motor 20 in the direction of arrow B, the worm gear 48 turns in the direction of arrow D and the arm 56 turns in the direction of arrow E. Movement of the arm 56 is transmitted to the tape cartridge holder, and a tape cartridge is loaded on the reel turntable (the tape cartridge loading). In this case, the worm shaft 34 tries to move in the direction of arrow C (axially) as load of the worm gear 48 is applied to it when it rotates in the direction of arrow B, but its movement is restricted because the end of arm 62 is kept run against the worm gear box 42. This restriction is released when the gear 52 turns by the fixed number of turns and the arm 62 is positioned by the cam groove 58 at a shifted position (when the tape cartridge loading is completed).

Figure 3:
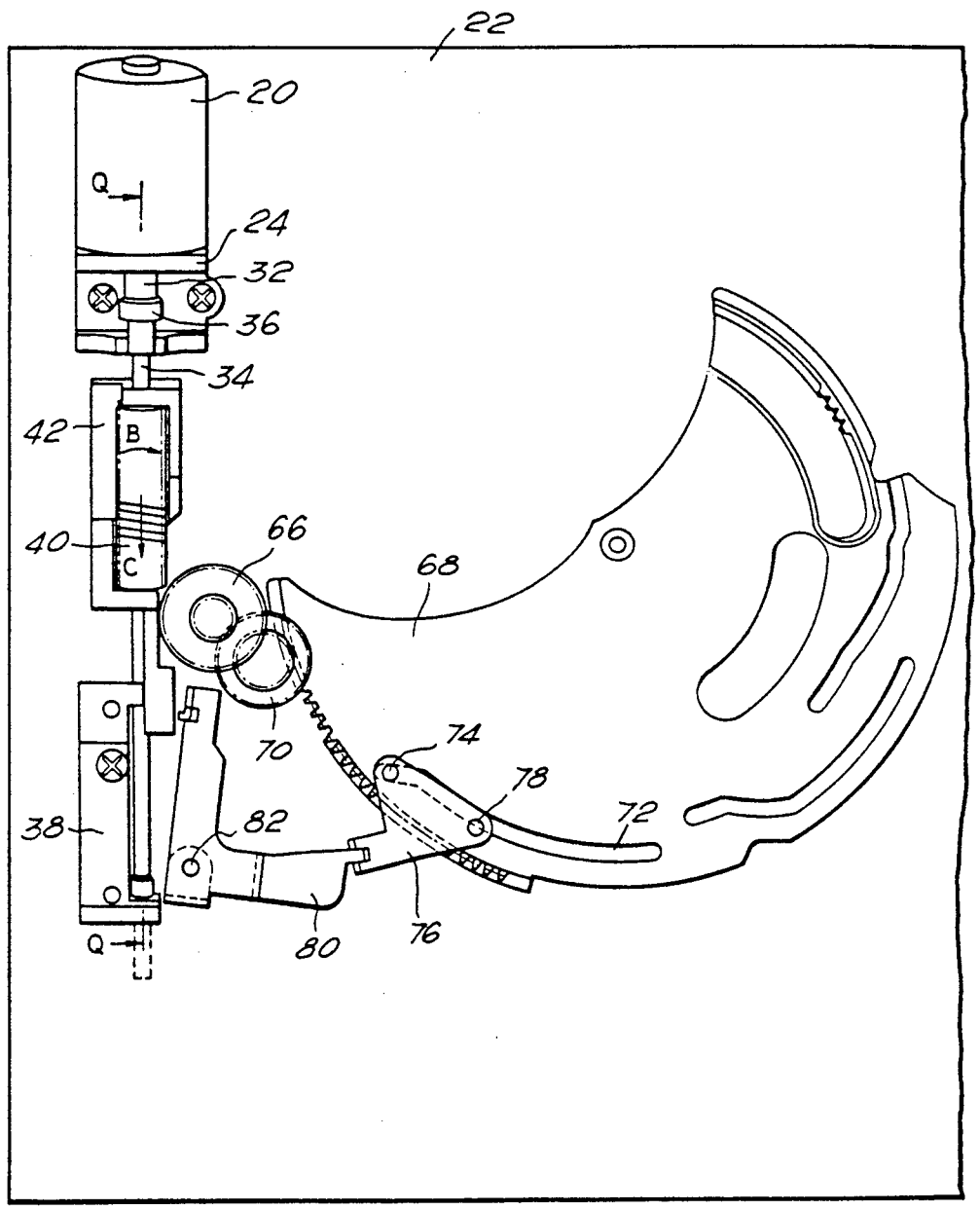
FIGS. 3 through 16 are corresponding plan views and sections for explaining the operation of the apparatus shown in FIGS. 1 and 2.
Figure 4:
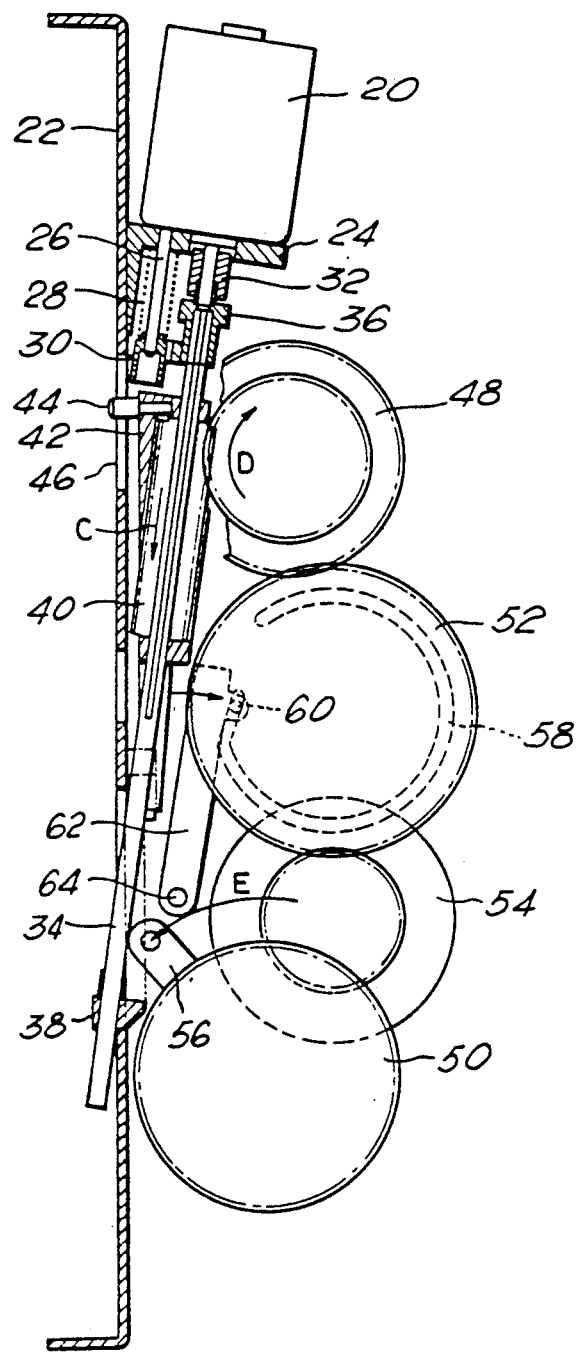

FIGS. 3 and 4 illustrate the situation when the tape cartridge loading has been completed. Under this condition, the arm 62 allows the worm gear 40 to move in the direction C.

When the worm shaft 34 is further rotated in the direction B from this state, the worm gear 40 moves in the direction C. Then, the worm gear 40 is shifted from the state meshing with the worm gear 48 to the state meshing with a gear 66. This worm shaft 34 can be made when a distance between the gears 48 and 66 and the axial length of the worm gear 40 are selected properly.

The gear 66 is one of the parts composing the second power transmission mechanism and rotation of this gear is transmitted to a cam disk 68 via a gear 70. The gears 66 and 70 are mounted to the main chassis 22 in a freely rotatable state so that their rotary surfaces are nearly parallel with the main chassis 22. The cam disk 68 is also mounted to the main chassis 22 in a freely rotatable state, and is able to form a tape running route by pulling out the tape from the tape cartridge loaded position (near the reel turntable) to a drum having a rotary magnetic head (the tape loading).

Figure 5:
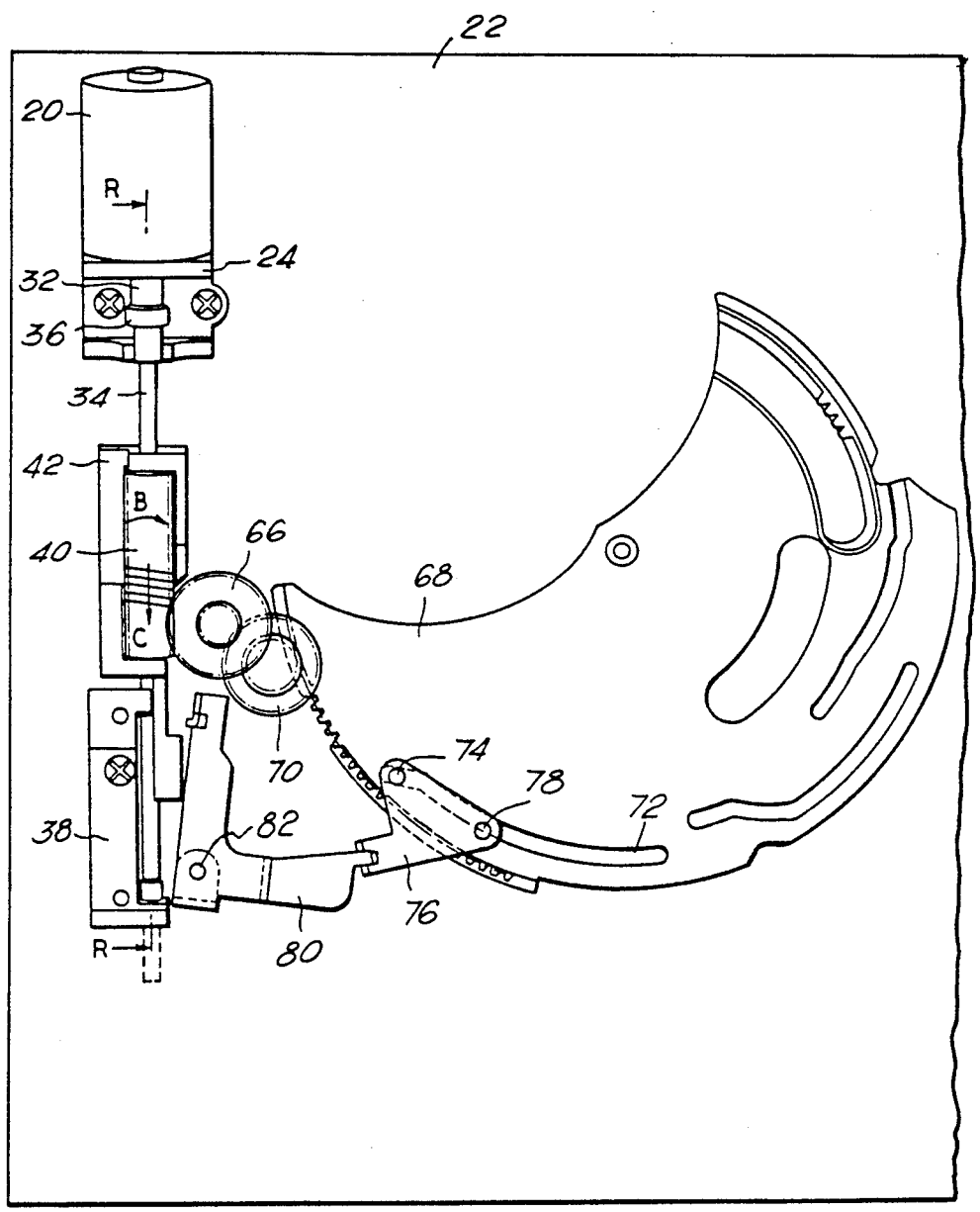
Figure 6:
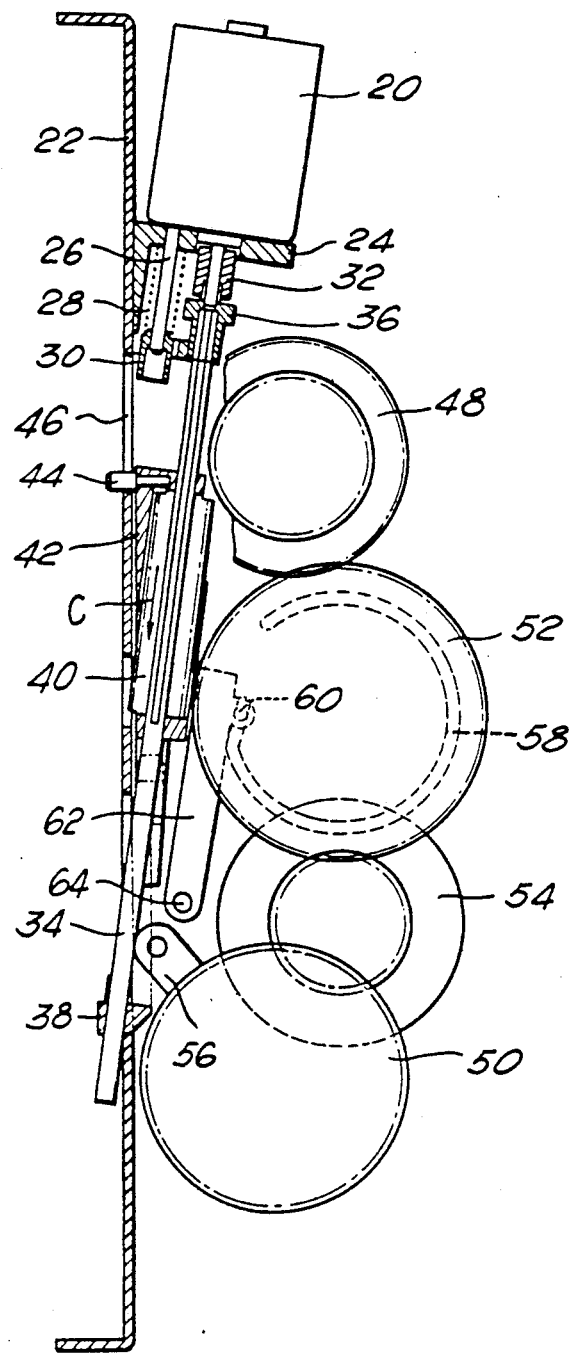

FIGS. 5 and 6 show the condition immediately before the tape loading starts.

Figure 7:
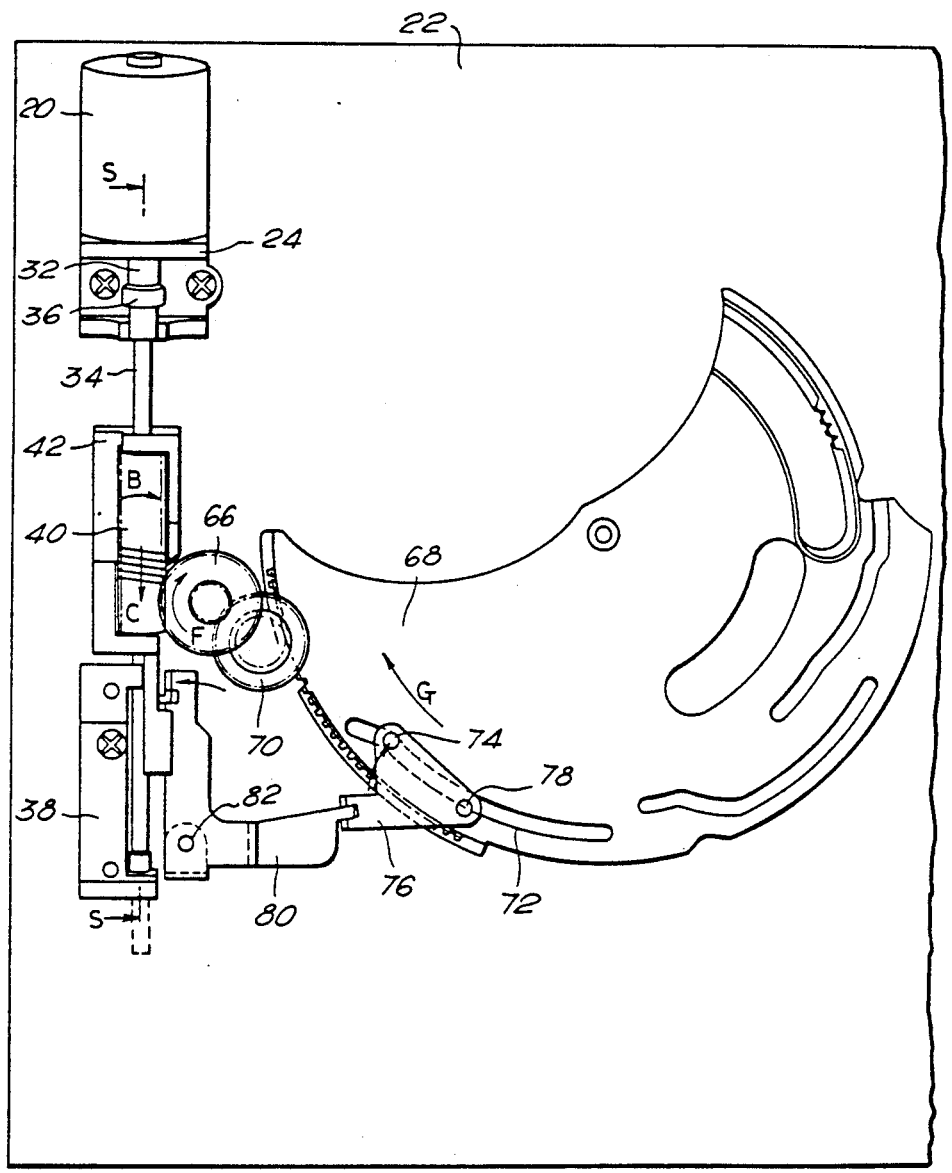
Figure 8:
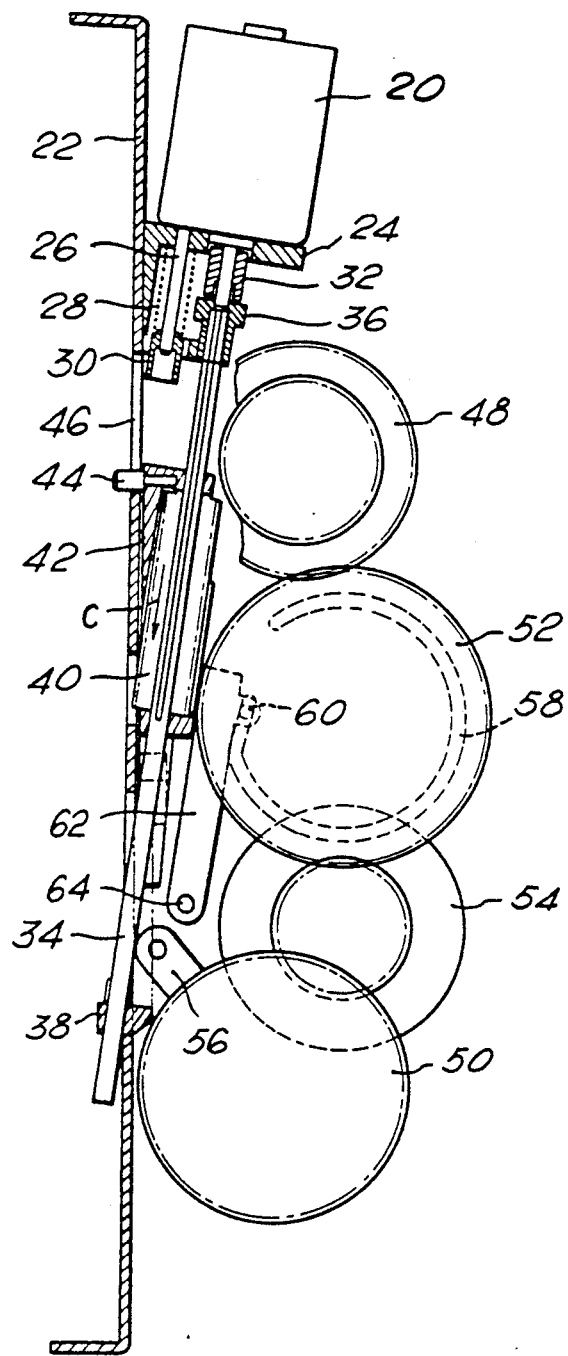

FIGS. 7 and 8 show the tape loading condition. When the motor 20 further turns the worm shaft 34 in the direction B, the pin 44 of the worm gear box 42 runs against the edge of the opening 46 and keeps the worm gear 40 at the second axial position (FIG. 8). Thus, rotation of the worm gear 40 is fully transmitted through the gear 66 to the cam disk 3, which is then rotated in the direction of arrow (FIG. 7).

There is a cam groove 72 formed on the cam disk 68 and a pin 74 of an arm 76 is inserted into the cam groove 72. The arm 76 is supported by a shaft 78 in a freely rotatable state. The shaft 78 is supported by a mounting base (not illustrated) on the main chassis 22. Rotation of the arm 76 is transmitted to one end of an intermediate arm 80. This intermediate arm 80 is mounted to the main chassis 22 in a freely rotatable state by a shaft 82, and another end of this arm 80 can be connected to the worm gear box 42 which is at the second axial position. FIG. 7 shows the state of the arm 80 connected to the worm gear box 42. FIGS. 1, 3 and 5 are the state before their connection.

Rotation of the worm gear 40 is transmitted to the cam disk 68 through the gear 66 and the tape loading is carried out. Movement of the worm gear 40 in the direction C is controlled by the pin 44. Thus, the tape loading is thus completed.

Figure 9:
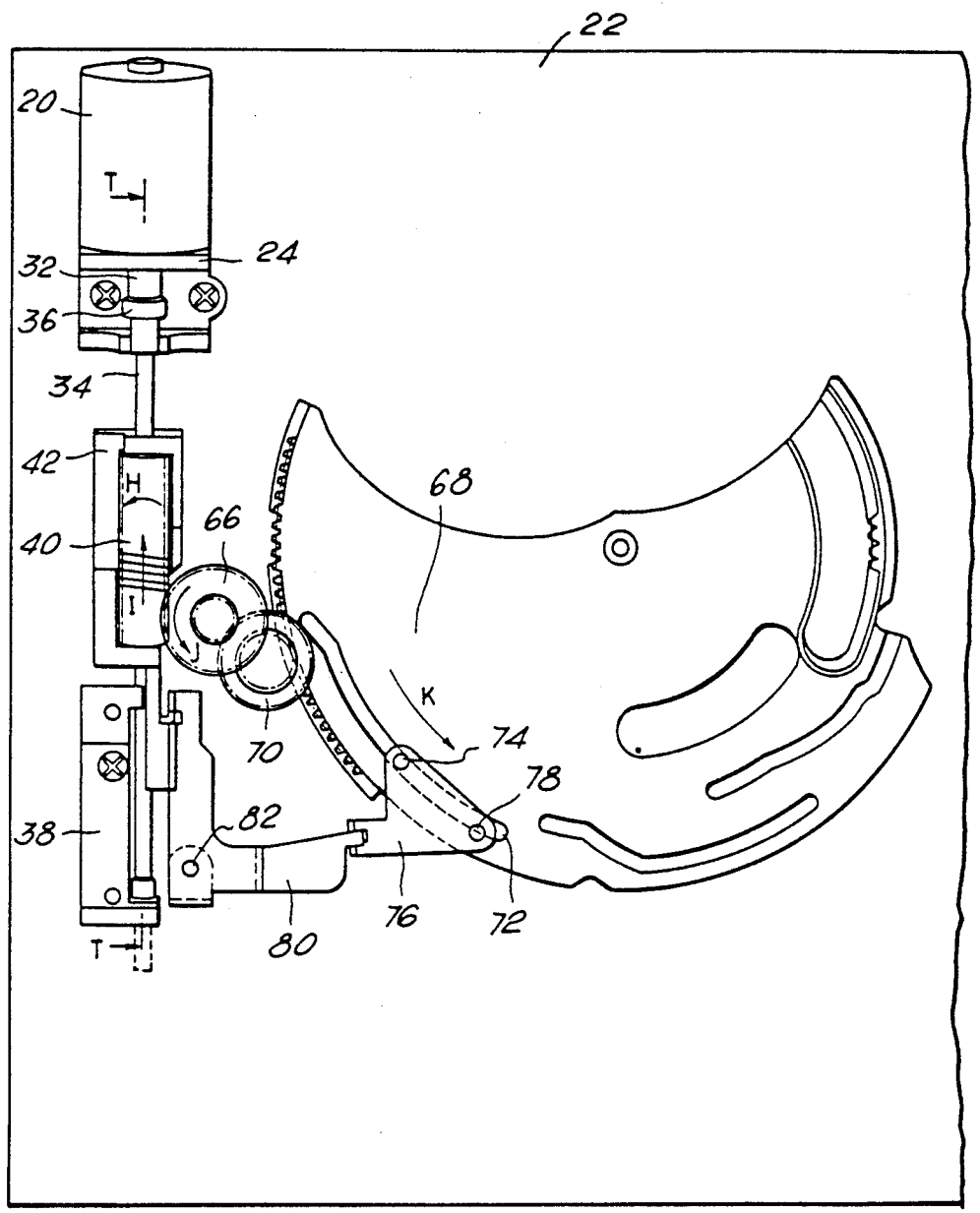
Figure 10:
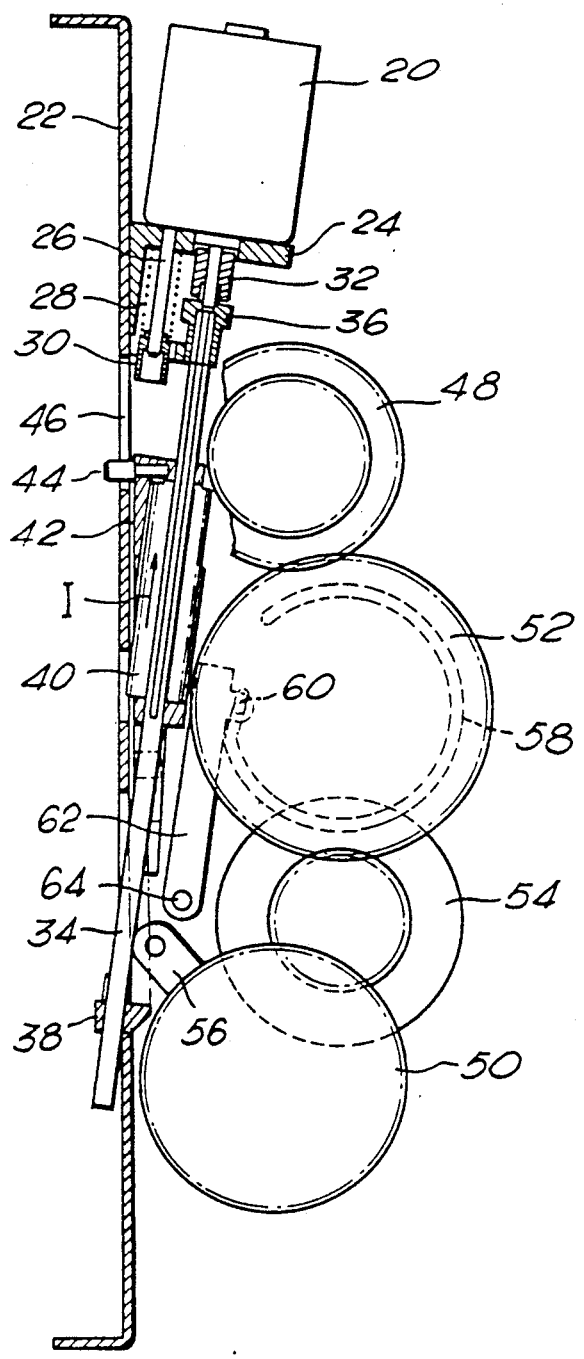

FIGS. 9 and 10 show the state where the unloading operation is carried out. In the unloading operation, the motor 20 turns in a direction reverse of that in the loading operation. When the worm gear 40 turns in the direction of arrow H, the gear 66 turns in the direction of arrow J and the cam disk 68 turn in the direction of arrow K. At this time, the worm gear 40 tries to move in the direction of arrow I as a force in that direction is applied by load from the gear 66 but its movement is restricted because the arm 80 is connected to the worm gear box 42 and the second axial position is maintained.

Figure 11:
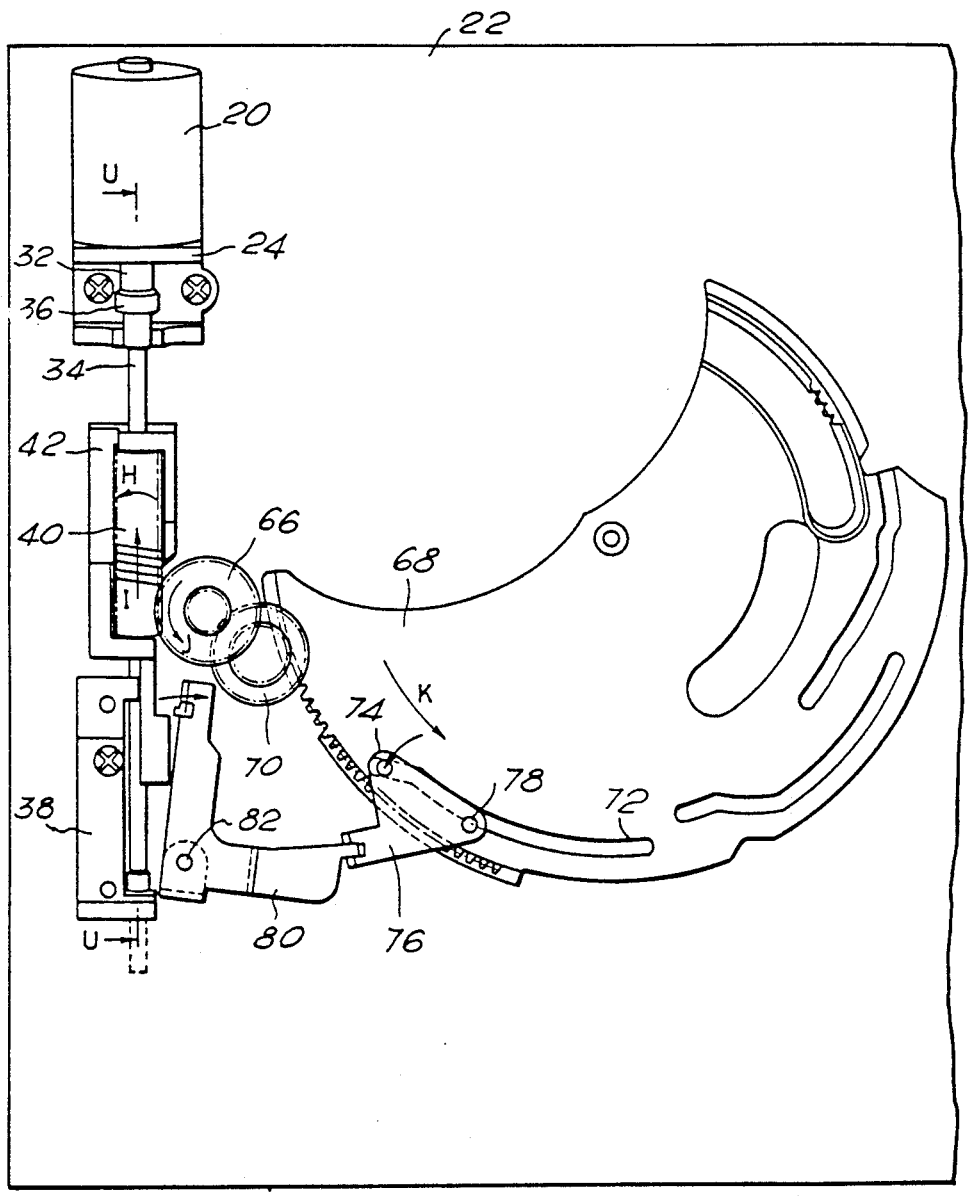
Figure 12:
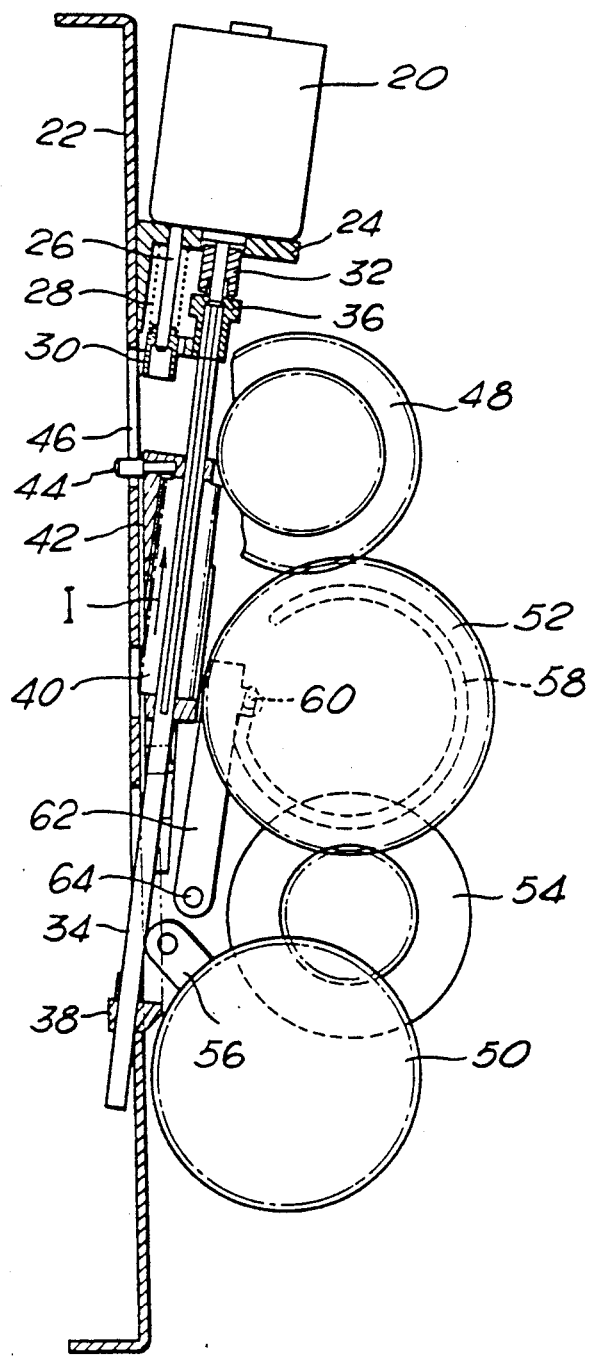
Figure 13:
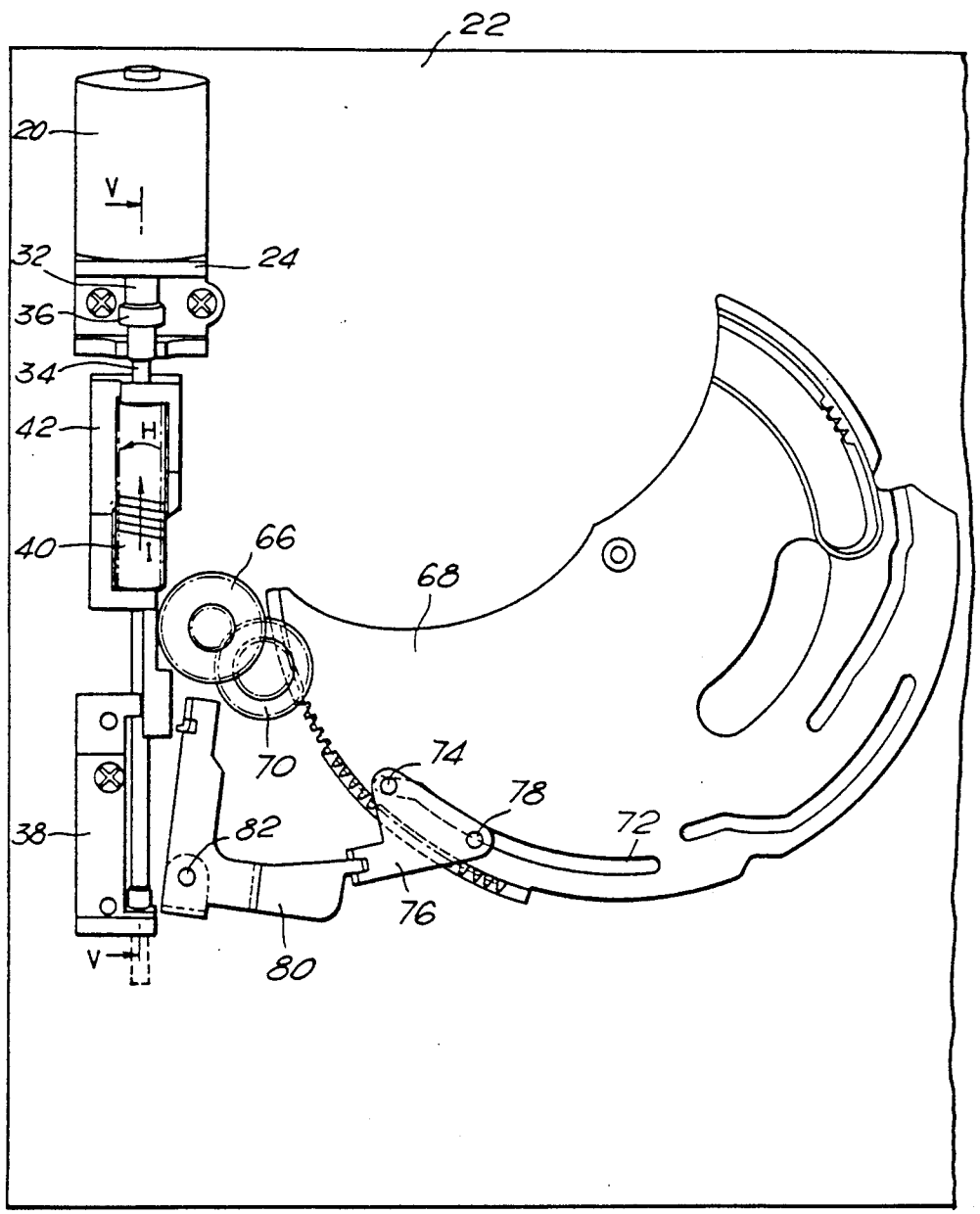
Figure 14:
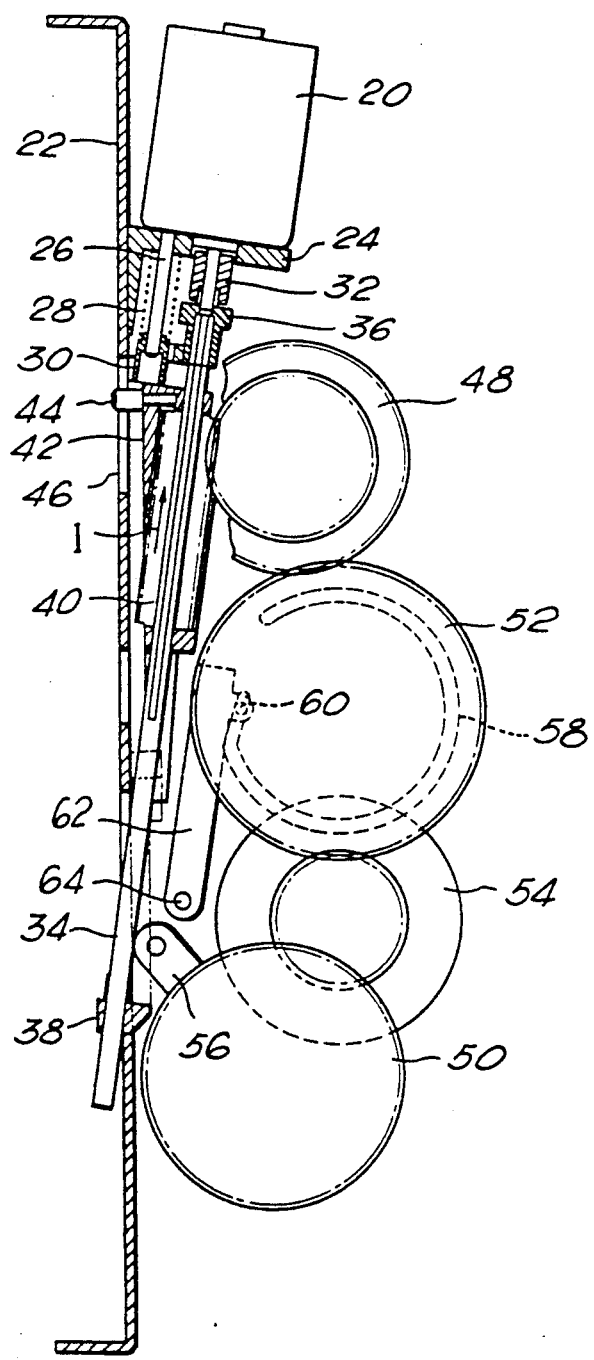
Figure 15:
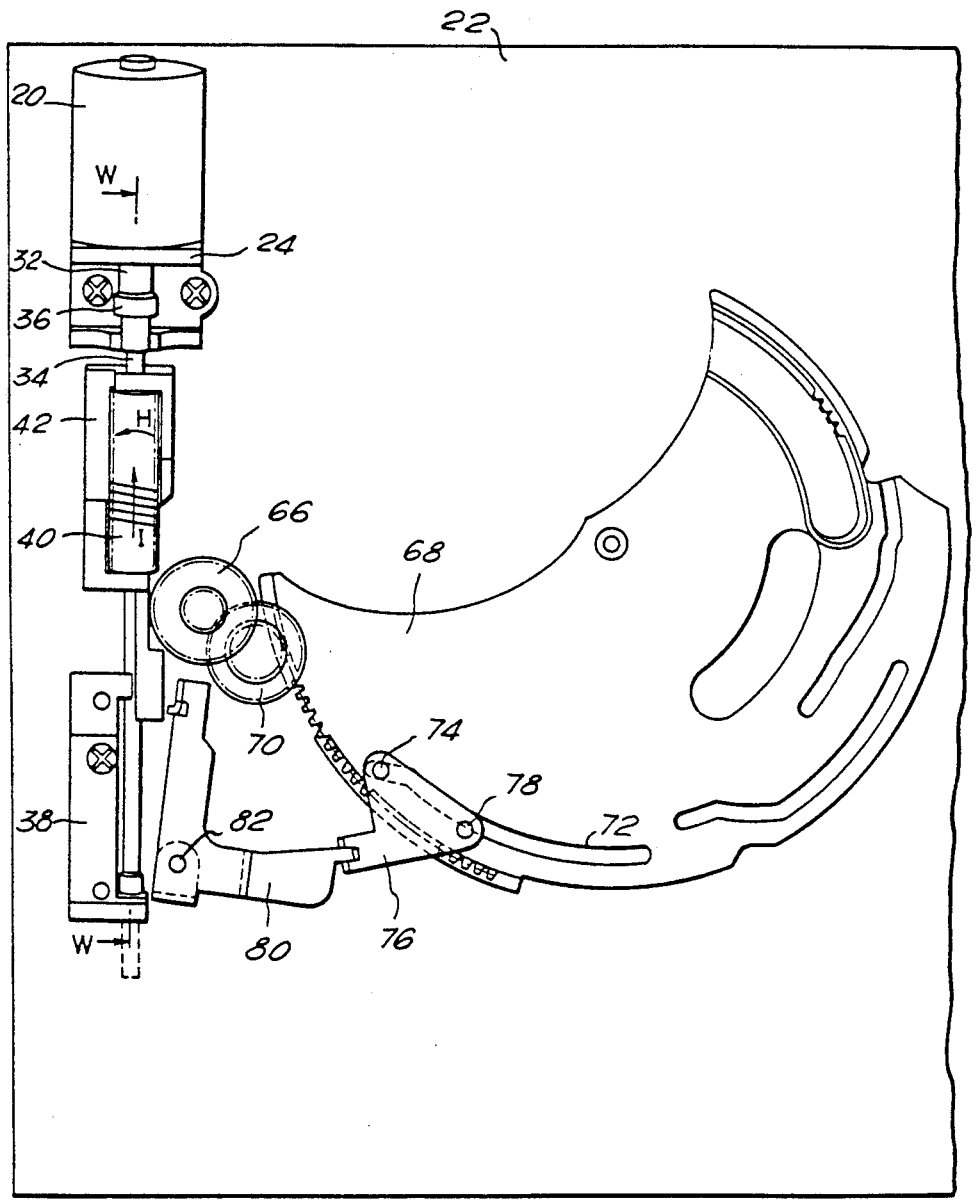
Figure 16:
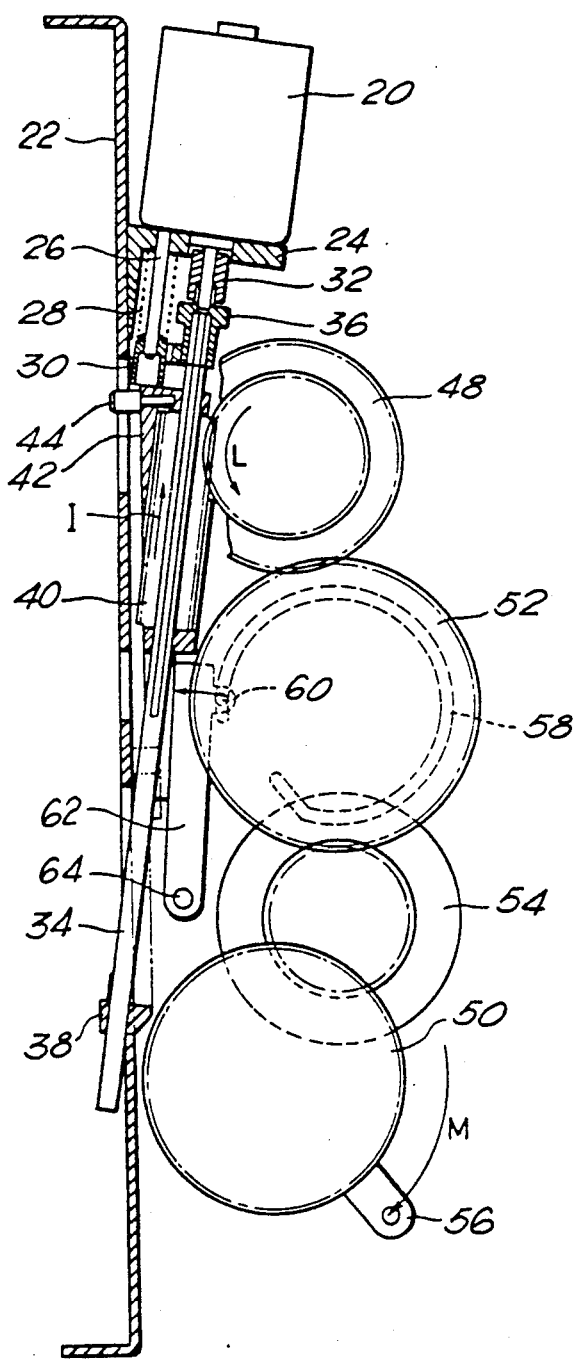

FIGS. 11 and 12 show the state where the tape unloading has been completed. Under this state, the arm 80 and the worm gear box 42 are disconnected by the action of the cam groove 72. When the worm gear 40 is further turned in the direction H in this state, the worm gear 40 moves in the direction I. Thus, as shown in FIGS. 13 and 14, the worm gear 40 comes to mesh with the worm gear 48 at the first power transmission mechanism side. Further, when the worm gear 40 is turned in the direction H, the worm gear 48 is turned and the unloading of a tape cartridge is started. FIGS. 15 and 16 show the state when the worm gear 40 turns at the first axial position, the worm gear 48 turns in the direction of arrow L and the gear 106 turns in the direction of arrow N. That is, the arm 56 returns to the original position shown in FIG. 2. Thus, a tape cartridge is returned from the loaded position on the reel turntable to the tape cartridge inserting slot. Further, the arm 62 also returns to the original position and the first axial position of the worm gear 40 can be maintained.

According to the present invention described above, an apparatus in simple structure can use a single motor to switch multiple driving objects. Further, a less expensive apparatus can be provided because a single motor for transmission of power is used.

As described above, the present invention can provide an extremely preferable tape cartridge loading/unloading apparatus.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A selective drive for a tape loading and unloading apparatus comprising:
   a motor, a shaft defining an axial direction, said shaft is driven by the motor;
   a worm gear which is mounted on the shaft in such a manner that it rotates together with the shaft and also adapted to freely move axially along the shaft;
   a first power transmission mechanism which is driven by meshing with the worm gear when the worm gear is at a first axial position on the shaft and the shaft is rotated in a first rotating direction;
   a first stopper mechanism interlocked with the first power transmission mechanism for keeping the worm gear at the first axial position until the first power transmission mechanism is driven by a fixed amount and thereafter for allowing axial movement of the worm gear;
   a second stopper mechanism which keeps the worm gear at a second axial position on the shaft;
   a second power transmission mechanism which is driven by meshing with the worm gear when the worm gear is at the second axial position and rotated in the first rotating direction; and
   a third stopper mechanism which interlocks with the second power transmission mechanism when the worm gear is at the second axial position and is rotated in a second rotating direction, wherein the third stopper mechanism keeps the worm gear at the second axial position until the second power transmission mechanism is driven by a fixed amount and then allows the worm gear to return to the first axial position.

2. A selective drive apparatus as in claim 1, wherein: the first stopper mechanism includes releasing means for releasing the worm gear from the first stopper mechanism after the first power transmission mechanism has been driven the fixed amount by the worm gear.

3. A selective drive apparatus as in claim 1, wherein: the third stopper mechanism includes releasing means for releasing the worm gear from the second stopper mechanism after the second power transmission mechanism has been driven the fixed amount by the worm gear.

* * * * *